(12) United States Patent
Ferber

(10) Patent No.: US 7,679,991 B2
(45) Date of Patent: Mar. 16, 2010

(54) PROCESSING OF SEISMIC DATA ACQUIRED USING TWIN OVER/UNDER STREAMERS

(75) Inventor: Ralf Ferber, Horsham (GB)

(73) Assignee: WesternGeco L. L. C., Houston, TX (US)

( * ) Notice: Subject to any disclaimer, the term of this patent is extended or adjusted under 35 U.S.C. 154(b) by 445 days.

(21) Appl. No.: 11/687,288

(22) Filed: Mar. 16, 2007

(65) Prior Publication Data

US 2008/0228402 A1 Sep. 18, 2008

(51) Int. Cl.
*G01V 1/38* (2006.01)
(52) U.S. Cl. ........................... 367/24; 367/21
(58) Field of Classification Search ........... 367/15, 367/20, 24, 21
See application file for complete search history.

(56) References Cited

U.S. PATENT DOCUMENTS

| | | | | |
|---|---|---|---|---|
| 4,752,916 A | * | 6/1988 | Loewenthal | 367/24 |
| 4,937,793 A | * | 6/1990 | Shuck et al. | 367/24 |
| 6,775,618 B1 | * | 8/2004 | Robertsson et al. | 702/14 |
| 7,319,636 B2 | * | 1/2008 | Robertsson et al. | 367/21 |
| 7,372,769 B2 | * | 5/2008 | Grion | 367/24 |
| 7,379,385 B2 | * | 5/2008 | Ferber | 367/20 |
| 2005/0265122 A1 | * | 12/2005 | Grion | 367/21 |
| 2008/0025147 A1 | * | 1/2008 | Ferber | 367/24 |

OTHER PUBLICATIONS

Monk, David J. Wavefield separation of twin streamer data. First Break, vol. 8, No. 3, Mar. 1990.*
Amundsen, "Wavenumber-based filtering of marine point-source data," *Geophysics*, 58(9):1335-1348, 1993.
Posthumus, "Deghosting using a twin streamer configuration," *Geophysical Prospecting*, 41:267-286, 1993.
Singh et al., "Broadband receiver response from dual-streamer data and applications in deep reflection seismology," *Geophysics*, 61(1):232-243, 1996.
International Search Report, dated Jun. 6, 2009, for PCT Application No. PCT/US2008/055982, filed Mar. 6, 2008.

* cited by examiner

*Primary Examiner*—Scott A Hughes (57) ABSTRACT

A method for processing seismic data acquired using a first over/under streamer and a second over/under streamer. In one implementation, the method may include estimating seismic data that would have been acquired by a third over/under streamer disposed at a depth equivalent to a distance separating the first over/under streamer from the second over/under streamer; and applying a dephase and sum algorithm to seismic data acquired by the first over/under streamer and the second over/under streamer and the estimated seismic data.

20 Claims, 5 Drawing Sheets

PROCESSING OF SEISMIC DATA ACQUIRED USING TWIN OVER/UNDER STREAMERS

BACKGROUND

1. Field of the Invention

Implementations of various technologies described herein generally relate to seismic data processing, and more particularly, processing seismic data acquired using twin over/under streamers.

2. Description of the Related Art

The following descriptions and examples do not constitute an admission as prior art by virtue of their inclusion within this section.

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, seismic streamers are towed behind a survey vessel. The seismic streamers may be several thousand meters long and contain a large number of sensors, such as hydrophones, geophones, and associated electronic equipment, which are distributed along the length of the seismic streamer cable. The survey vessel may also include one or more seismic sources, such as air guns and the like.

The seismic streamers may be in an over/under configuration, i.e., one set of streamers being suspended above another set of streamers. Two streamers in an over/under configuration, referred to as twin streamers, may be towed much deeper than streamers in a conventional single configuration.

As the seismic streamers are towed behind the survey vessel, acoustic signals, commonly referred to as "shots," produced by the one or more seismic sources are directed down through the water into strata beneath the water bottom, where they are reflected from the various subterranean geological formations. Reflected signals are received by the sensors, digitized, and then transmitted to the survey vessel. The digitized signals are referred to as seismograms and are recorded and at least partially processed by a signal processing unit deployed on the survey vessel. The ultimate aim of this process is to build a representation of the subterranean geological formations beneath the streamers. Analysis of the representation may indicate probable locations of hydrocarbon deposits in the subterranean geological formations.

In order to build the representation of the subterranean geological formations, streamer seismic data may be processed in an effort to create an up-going wave field at the sea surface, or zero depth. Typically, the seismic data from a streamer has notches or areas without data because the equipment used may be insensitive at certain frequencies. A primary aim of twin streamer acquisition is to use the second streamer data to fill in the information at the notch frequencies of the first streamer. In addition, the seismic data from each streamer may be a combination of up-going and down-going wave fields. The up-going wave fields may include data about the subterranean geological formations. The down-going wave fields may typically be reflections of the up-going wave fields at the sea surface, referred to as surface seismic ghosts. The down-going wave fields may be considered noise that needs to be attenuated. A multitude of processing techniques generally aimed at filling the notch frequencies and removing the down-going wave fields have been developed.

Various conventional techniques for processing seismic data acquired by streamers or sources in a twin over/under configuration may use a shift and subtract algorithm. Generally in a shift and subtract algorithm, the data recorded on one of the twin over/under streamers may be time shifted such that the up-going or down-going wave fields occur at the same time on both streamers. Subtraction of one data set from the other may remove the aligned wave fields. The data set of the wave fields may be commonly referred to as a ghost and may be dependent on the vertical separation of the twin over/under streamers.

Other conventional techniques for processing seismic data acquired by streamers or sources in a twin over/under configuration involve a dephase and sum algorithm. Generally in the application of the dephase and sum algorithm, the data recorded at each streamer may be first processed by a correlation step to dephase the individual surface ghost wavelets for each of the two streamers. The two dephased data sets may then be summed yielding a seismic data set that would have been acquired by a single streamer at the sea surface.

SUMMARY

Described herein are implementations of various technologies for a method for processing seismic data acquired using a first over/under streamer and a second over/under streamer. In one implementation, the method may include estimating seismic data that would have been acquired by a third over/under streamer disposed at a depth equivalent to a distance separating the first over/under streamer from the second over/under streamer; and applying a dephase and sum algorithm to seismic data acquired by the first over/under streamer and the second over/under streamer and the estimated seismic data.

Described herein are also implementations of various technologies for a computer-readable medium having stored thereon computer-executable instructions which, when executed by a computer, cause the computer to: apply a shift and subtract algorithm to seismic data acquired by a first over/under streamer and a second over/under streamer to generate simulated seismic data that would have been acquired by a third over/under streamer disposed at a depth equivalent to a distance separating the first over/under streamer from the second over/under streamer; and apply a dephase and sum algorithm to the acquired seismic data and the simulated seismic data.

Described herein are also implementations of various technologies for a computer system, which may include a processor; and a memory comprising program instructions executable by the processor to: apply a shift and subtract algorithm to seismic data acquired by a first over/under streamer and a second over/under streamer to generate simulated seismic data that would have been acquired by a third over/under streamer disposed at a depth equivalent to a distance separating the first over/under streamer from the second over/under streamer; apply a dephase algorithm to the acquired seismic data and the simulated seismic data; and sum the dephased seismic data.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs generally describe one or more implementations of various techniques directed to processing seismic data acquired using two over/under streamers. In one implementation, a shift and subtract algorithm may be applied to seismic data that have been acquired using two over/under streamers to generate simulated (or pseudo) seismic data that would have been acquired by an over/under streamer disposed at a depth equivalent to a distance separating the two over/under streamers. A dephase and sum algorithm may then be applied to the acquired seismic data and the simulated seismic data to generate combined seismic data that would have been acquired by a single streamer disposed on at the sea surface that includes only data from up-going wave fields. A normalization algorithm may then be applied to the combined seismic data to remove the residual zero phase amplitude distortion from the combined seismic data.

Figure 1:
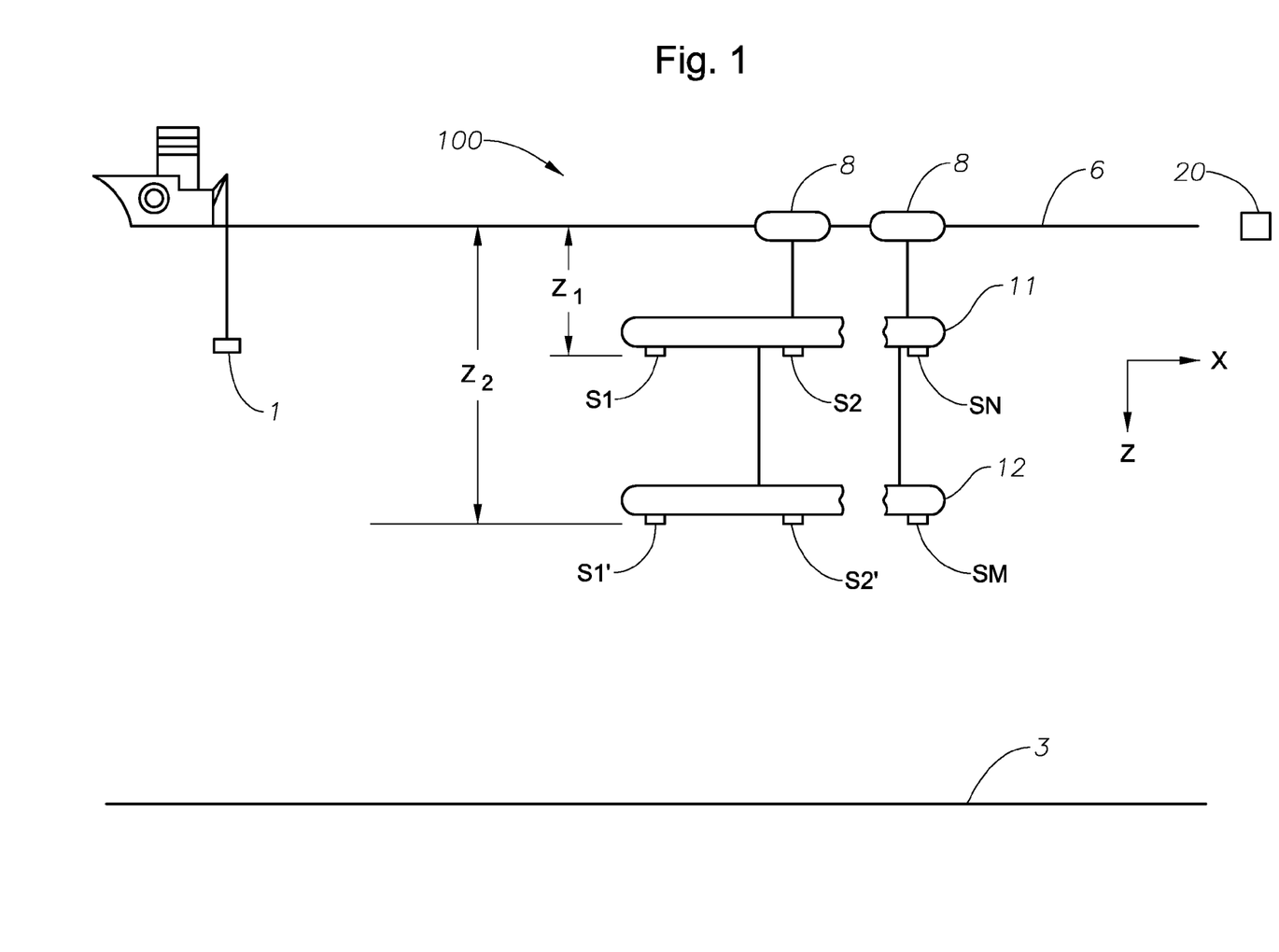
FIG. 1 illustrates a schematic diagram of a marine seismic survey in accordance with implementations of various techniques described herein.

FIG. 1 illustrates a schematic diagram of a marine seismic survey 100 in accordance with implementations of various techniques described herein. In one implementation, the marine seismic survey 100 may include a source array 1 configured to emit seismic energy. Although only one source array 1 is illustrated in FIG. 1, it should be understood that more than one source array may be used in implementations of various techniques described herein.

The marine seismic survey 100 may further include a first streamer 11 and a second streamer 12, which are suspended within a water column at different depths below the surface of the sea 6. The second streamer 12 may be suspended below the first streamer 11. The second streamer 12 may be deployed to be nominally vertically below the first streamer 11. However, the action of tides and currents may prevent the second streamer 12 from being exactly vertically below the first streamer 11. The streamers may be deployed such that the first streamer 11 is deployed at a nominal depth $Z_1$ below the surface 6 of the sea and the second streamer 12 is deployed at a nominal depth $Z_2$ below the surface 6 of the water column, where $Z_2 > Z_1$. However, the action of tides and currents and the effect of surface wave fields may cause the separation between the streamers, i.e., $Z_2 - Z_1$, to vary from the intended value. This arrangement may be referred to as an over/under combination of the streamers. The term "over" is typically associated with the shallower streamer, e.g., the first streamer 11, and the term "under" is typically associated with the deeper streamer, e.g., the second streamer 12. It should be understood that in some implementations, twin vertical over/under sources may be used in lieu of or in combination with twin over/under streamers.

A plurality of pressure sensors may be disposed along each streamer, with the first streamer 11 having pressure sensors S1, S2 . . . SN up to a total of N pressure sensors and the second streamer 12 having pressure sensors S1', S2' . . . SM up to a total of M pressure. Each streamer may have the same number of pressure sensors, i.e., N=M. Although the streamers have been described as having pressure sensors disposed thereon, it should be understood that in some implementations the streamers may have other types of receivers, such as particle velocity sensors and the like. The streamers may be suspended from one or more floats 8 so that all the pressure sensors of one streamer may be at substantially the same depth in a flat sea.

The marine seismic survey 100 may further include a processing apparatus 20 for processing seismic data acquired by the pressure sensors on the streamers 11 and 12 as a result of actuating the source array 1 to emit seismic energy. The processing apparatus 20 may be located, for example, on shore, on the towing vessel, or on another vessel. Data acquired at the sensors on the streamers may be transmitted to a storage means, e.g., located on the towing vessel, by a communication means, e.g., an electrical, optical or wireless link, and may subsequently be passed to the processing apparatus 20. Alternatively, data acquired at the sensors may be stored for subsequent retrieval in storage means provided on the streamers. The processing apparatus 20 may be described in more detail with reference to FIG. 5.

The source array 1 may be an array of airguns or any other type of emitters, such as marine vibrator units and the like. Energy emitted from the source array 1 may be reflected by the seabed 3 or by other reflectors (not shown) below the seabed 3 and may then be detected by the pressure sensors on the streamers 11 and 12.

Figure 2:
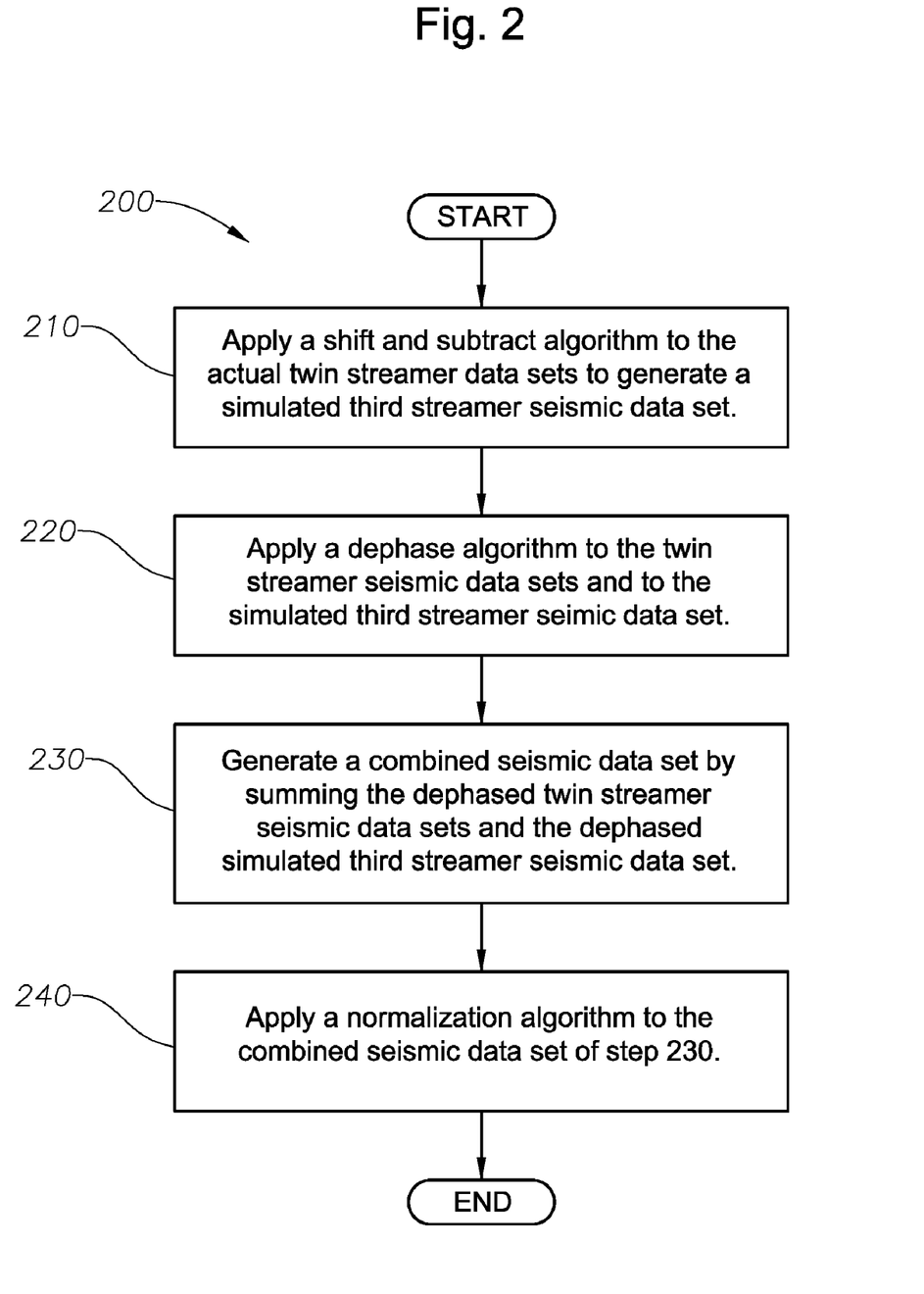
FIG. 2 illustrates a flow diagram of a method for processing seismic data in accordance with implementations of various techniques described herein.

FIG. 2 illustrates a flow diagram of a method 200 for processing seismic data in accordance with implementations of various techniques described herein. In one implementation, the seismic data may be acquired using a marine seismic survey having a twin over/under streamer configuration, such as the one described in FIG. 1. Although various implementations are described with reference to seismic data acquired using a twin over/under streamer configuration, it should be understood that some implementations may be used with a twin over/under source array configuration in combination with or in lieu of a twin over/under streamer configuration.

At step 210, a shift and subtract algorithm may be applied to seismic data acquired using a twin over/under streamer configuration to generate a set of seismic simulated (pseudo) data that would have been acquired by a third over/under streamer disposed at a depth equivalent to a distance separating the twin over/under streamers. For example in FIG. 3, a simulated third over/under streamer 320 acquiring the simulated seismic data is disposed at a depth of 3 meters, which is the distance separating a first over/under streamer 311 from a second over/under streamer 312. The first over/under streamer 311 and the second over/under streamer 312 may be disposed at any depth.

As a consequence to applying the shift and subtract algorithm, the simulated seismic data may include a ghost of up-going wave fields that occurs at a traveltime corresponding to the distance separating the twin over/under streamers.

In one implementation, the shift and subtract algorithm may be expressed by the following formula:

$$P(\omega,k_x,k_y,z_0)=e^{ik_zz_1}P(\omega,k_x,k_y,z_2)-e^{ik_zz_2}P(\omega,k_x,k_y,z_1) \quad \text{Equation (1)}.$$

Figure 3:
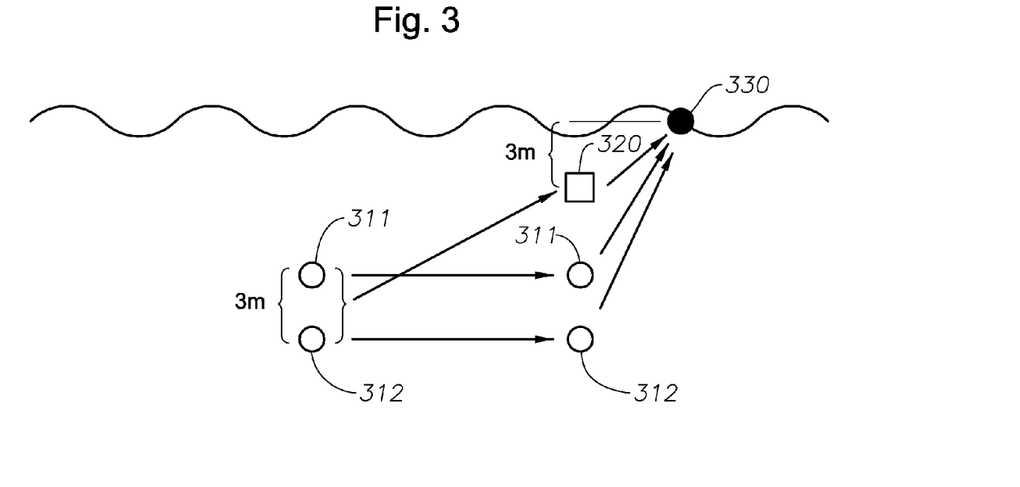
FIG. 3 illustrates a schematic diagram of how the seismic data may be processed in accordance with implementations of various techniques described herein.

In Equation 1, $P(\omega,k_x,k_y,z)$ denotes the pressure wave field at depth z and w denotes the angular frequency. Further, $z_0=z_2-z_1$ denotes the streamer separation between the actual over/under streamers 311 and 312. The spatial wavenumbers are denoted by $(k_x,k_y)$ with $$k_z = \sqrt{\left(\frac{\omega}{c}\right)^2 - k_x^2 - k_y^2},$$

where c is the pressure wave field velocity in water.

At step 220, a dephasing algorithm may be applied to the acquired seismic data and the simulated seismic data. The dephasing algorithm may be configured to correlate each seismic data set with a ghost transfer function. In one implementation, the dephasing algorithm may be expressed as:

$$D_n(\omega,k_x,k_y,z_n)=(e^{-ik_zz_n}-e^{ik_zz_n})P(\omega,k_x,k_y,z_n), n=1,2,3 \quad \text{Equation (2)}.$$

In Equation 2, $D_n$ denotes a dephased seismic data set at the sea surface, where n represents each seismic data set. For example, $D_1$ denotes the dephased simulated data, $D_2$ the dephased upper streamer data and $D_3$ the dephased lower streamer data. Likewise, $P(\omega,k_x,k_y,z_1)$ denotes the simulated streamer data, $P(\omega,k_x,k_y,z_2)$ the upper streamer data, and $P(\omega, k_x,k_y,z_3)$ the lower streamer data.

At step 230, the dephased acquired seismic data and the dephased simulated seismic data may be summed to generate combined seismic data that would have been acquired by a single streamer disposed at the sea surface. During the summation, the power spectra, i.e., squared amplitude spectra, of the simulated ghost wavelets may be summed, thereby filling in the corresponding notch frequencies. As a result, however, a zero phase amplitude distortion may be generated due to the sum of the squared amplitude spectra of the data sets. In one implementation, the summation may be performed according to the following formula:

$$\tilde{P}'(\omega, k_x, k_y, z = 0) = \sum_{n=1,2,3} D_n(\omega, k_x, k_y, z_n). \quad \text{Equation (3)}$$

The summation may be configured to attenuate down-going wave fields, thereby generating a slightly distorted estimate of the up-going pressure wave field at the sea surface. The distortion correction will be discussed at step 240 in the paragraphs below.

Following the example illustrated in FIG. 3, seismic data acquired by the first over/under streamer 311 and the second over/under streamer 312 and simulated seismic data that would have been acquired by the third over/under streamer 320 may be dephased and summed to generate combined seismic data that would have been acquired by a single streamer 330 disposed at the sea surface that includes only data from up-going wave fields. Although the dephasing algorithm and the summing algorithm are described on separate steps, i.e., step 220 and step 230, it should be understood that in some implementations the dephasing algorithm and the summation may be performed as a single step.

At step 240, a normalization algorithm may be applied to the combined seismic data that would have been acquired by the single streamer disposed at the sea surface to remove the residual zero phase amplitude distortion from the combined seismic data. In one implementation, the normalization algorithm may be expressed as:

$$\tilde{P}(\omega, k_x, k_y, z = 0) = \frac{\tilde{P}'(\omega, k_x, k_y, z = 0)}{\left(\sum_{n=1,2,3} |1 - e^{2ik_zz_n}|^2\right) + \varepsilon}. \quad \text{Equation (4)}$$

The normalization algorithm may involve a spectral division; however, only with a single notch at zero-frequency, if the vertical separation between the streamers is properly selected. Division by zero may be avoided by adding a small amount ε to the divisor. In this manner, various implementations described herein may be used to convert seismic data recorded from twin over/under streamers into seismic data that would have been acquired by a single streamer disposed at the sea surface that includes only data from up-going wave fields. Although various implementations described herein may be described with reference to twin over/under streamers, it should be understood that twin over/under sources may be used in lieu of or in combination with twin over/under streamers.

Figure 4A:
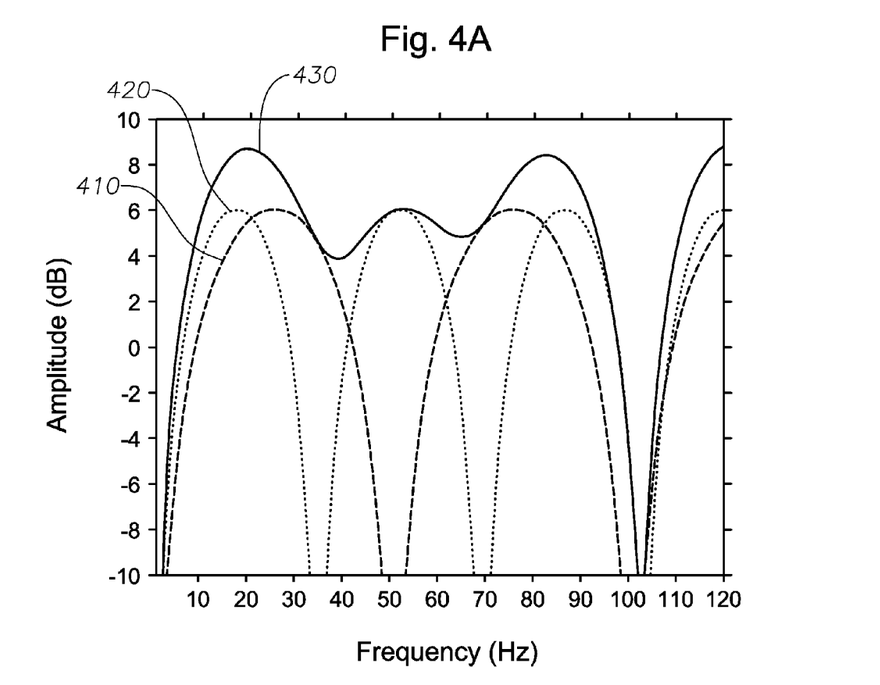
FIGS. 4A-C illustrate an example of the gain in signal-to-noise ratio achieved by processing seismic data in accordance with implementations of various techniques described herein.
Figure 4B:
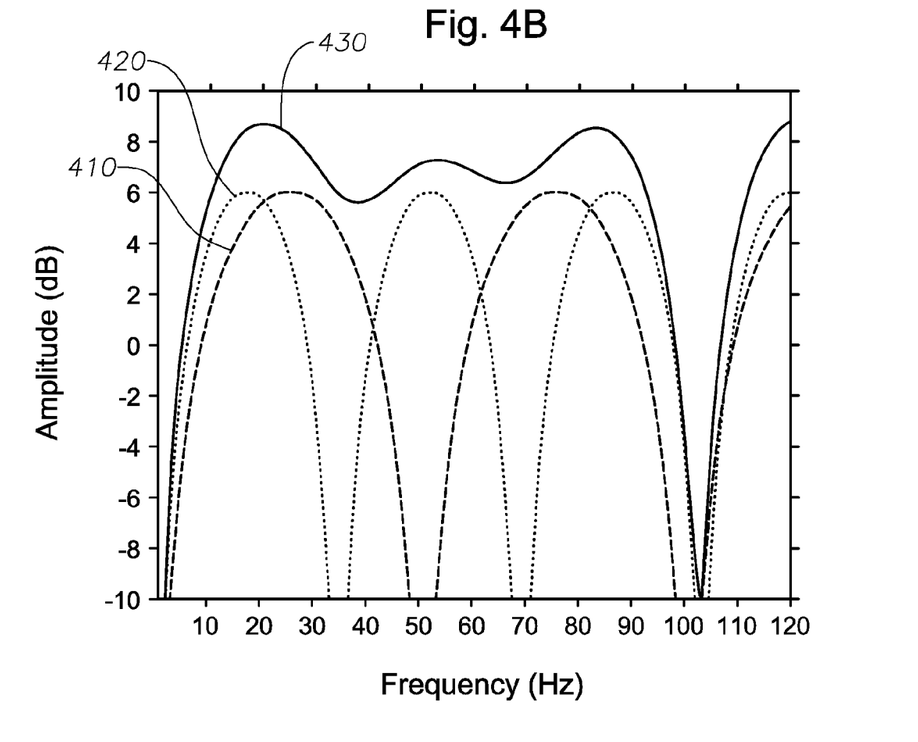
Figure 4C:
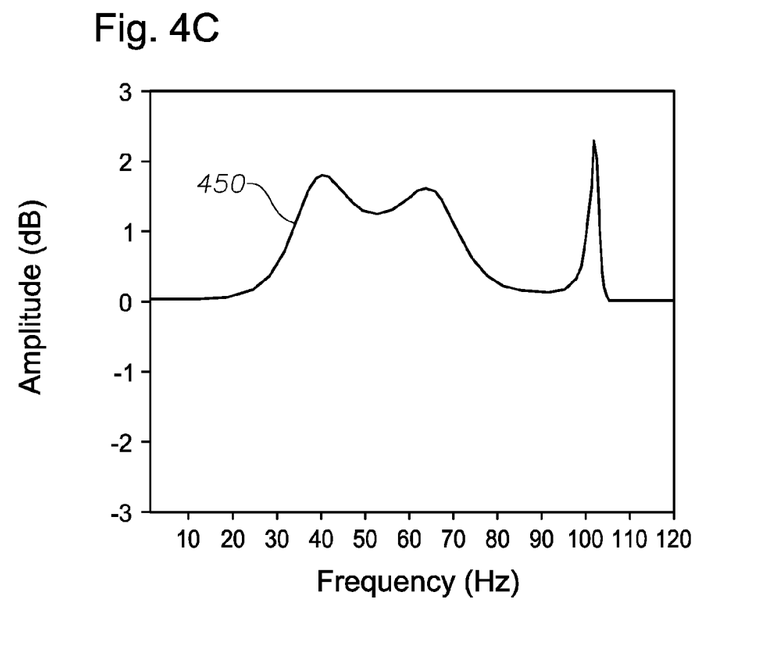

Advantages of various implementations described herein include a much improved notch frequency filling capability and a gain in signal-to-noise ratio over that of conventional twin streamer processing. FIGS. 4A-C illustrate an example of the gain in signal-to-noise ratio achieved by processing seismic data in accordance with implementations of various techniques described herein. FIG. 4A illustrates the signal-to-noise ratio resulting from processing of seismic data recorded from twin over/under streamers by conventional methods. The signal-to-noise ratio 410 of the dephased seismic data from a first streamer is illustrated by the dashed curves and the signal-to-noise ratio 420 of the dephased seismic data from a second streamer is illustrated by the dotted curves. The signal-to-noise ratio 430 of the combined seismic data set resulting from the conventional processing is illustrated by the solid curve. The signal-to-noise ratio of the conventionally combined twin streamer data may typically be better than that of the individual streamer data sets, although identical at certain frequencies, such as around 40 Hz and 52 Hz, as shown in FIG. 4A.

FIG. 4B illustrates the signal-to-noise ratio resulting from processing the same seismic data recorded from twin over/under streamers in accordance with various implementations described herein. Again, the signal-to-noise ratio 410 of the dephased seismic data from a first streamer is illustrated by the dashed curves and the signal-to-noise ratio 420 of the dephased seismic data from a second streamer is illustrated by the dotted curves. The signal-to-noise ratio 440 of the data processed in accordance with various implementations described herein is illustrated as a solid curve. The signal-to-noise ratio of the combined twin streamer data processed in accordance with various implementations described herein may be larger than the signal-to-noise ratio of the individual twin streamer data sets and the signal-to-noise ratio of the conventionally combined twin streamer data.

FIG. 4C illustrates the signal-to-noise ratio difference 450 when the signal-to-noise ratio 430 of the conventionally processed data is compared with the signal-to-noise ratio 440 of the data processed in accordance with various implementations described herein. The signal-to-noise ratio difference 450 may amount to a gain of about 2 dB for frequencies between about 40 Hz and about 70 Hz.

Figure 5:
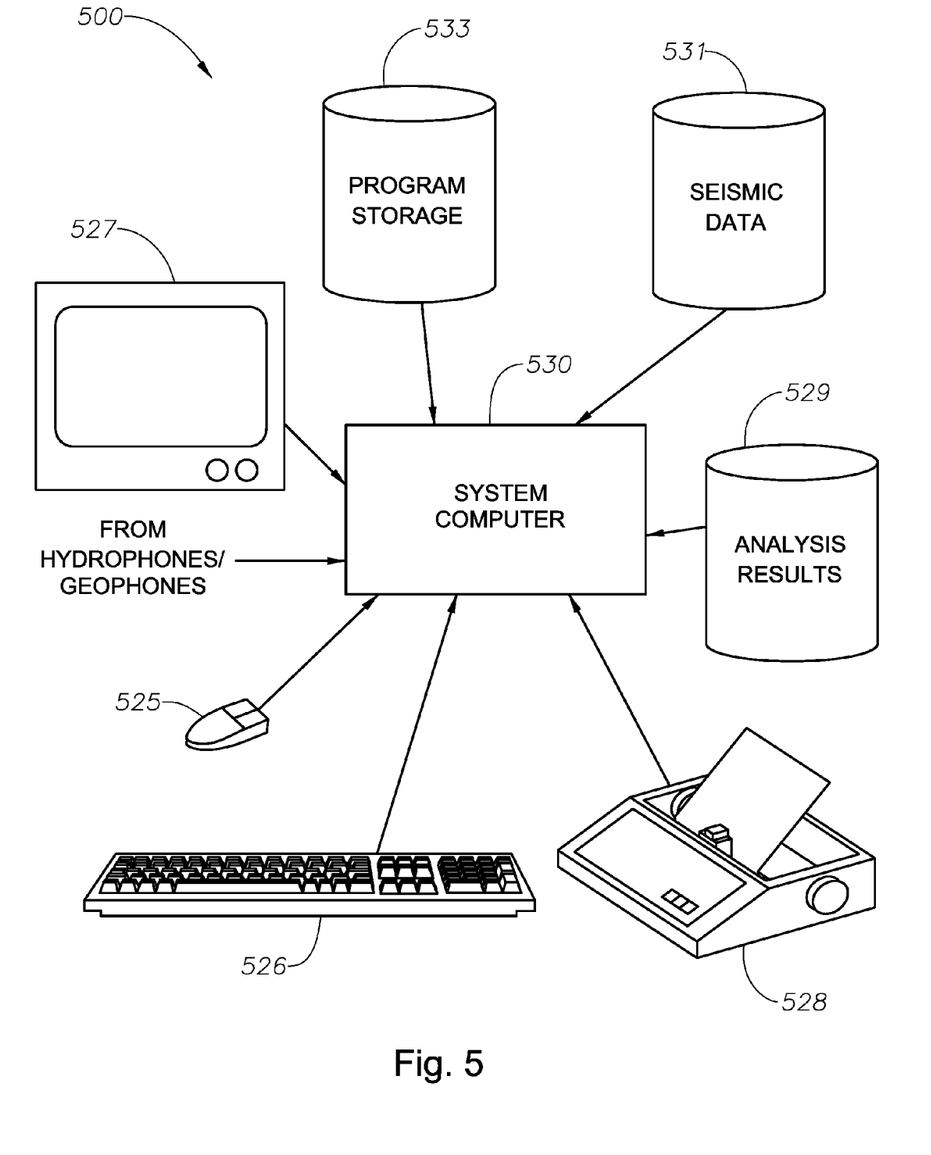
FIG. 5 illustrates a computing system, into which implementations of various techniques described herein may be implemented.

FIG. 5 illustrates a computing system 500, into which implementations of various technologies described herein may be implemented. The computing system 500 may include one or more system computers 530, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 530 may be in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, seismic data from the receivers may be stored in disk storage device 531. The system computer 530 may retrieve the appropriate data from the disk storage device 531 to process seismic data according to program instructions that correspond to implementations of various technologies described herein. The program instructions may be written in a computer programming language, such as C++, Java and the like. The program instructions may be stored in a computer-readable medium, such as program disk storage device 533. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 530. Communication media may embody computer readable instructions, data structures, program modules or other data in a modulated data signal, such as a carrier wave field or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 530 may present output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 may be in communication with the receivers (either directly or via a recording unit, not shown), to receive signals indicative of the reflected seismic energy. These signals, after conventional formatting and other initial processing, may be stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data acquired using a first over/under streamer and a second over/under streamer, comprising:
    estimating seismic data that would have been acquired by a third over/under streamer disposed at a depth equivalent to a distance separating the first over/under streamer from the second over/under streamer using the seismic data acquired by one or more sensors on the first over/under streamer and the second over/under streamer, wherein the estimated seismic data comprises a ghost of up-going wave fields; and
    applying a dephase and sum algorithm to the seismic data acquired by the first over/under streamer and the second over/under streamer and the estimated seismic data, wherein the dephased seismic data represents seismic data that would have been acquired at a sea surface.

2. The method of claim 1, wherein estimating the seismic data comprises applying a shift and subtract algorithm to the seismic data acquired by the first over/under streamer and the second over/under streamer.

3. The method of claim 1, wherein estimating the seismic data comprises applying $$P(\omega, k_x, k_y, z_0) = e^{ik_z z_1} P(\omega, k_x, k_y, z_2) - e^{ik_z z_2} P(\omega, k_x, k_y, z_1),$$

where $P(\omega, k_x, k_y, z)$ denotes a pressure wave field at depth z, $\omega$ denotes angular frequency, $z_0$ denotes the distance separating the first streamer from the second streamer, $k_x$, and $k_y$ denote spatial wavenumbers, $$k_z = \sqrt{\left(\frac{\omega}{c}\right)^2 - k_x^2 - k_y^2}$$

and where c is a pressure wave field velocity in water.

4. The method of claim 1, wherein the ghost of up-going wave fields occurs at a traveltime corresponding to the distance separating the first over/under streamer from the over/under second streamer.

5. The method of claim 1, wherein applying the dephase and sum algorithm comprises applying $$D_n(\omega, k_x, k_y, z_n) = (e^{-ik_z z_n} - e^{ik_z z_n})P(\omega, k_x, k_y, z_n), n = 1, 2, 3,$$

where $D_n$ denotes dephased seismic data acquired by a single streamer disposed at the sea surface.

6. The method of claim 1, wherein applying the dephase and sum algorithm comprises correlating each of the acquired seismic data and the estimated seismic data with a ghost transfer function.

7. The method of claim 1, wherein applying the dephase and sum algorithm comprises summing the dephased seismic data acquired by the first over/under streamer and the second over/under streamer and the dephased estimated seismic data.

8. The method of claim 7, wherein summing the dephased seismic data acquired by the first over/under streamer and the second over/under streamer and the dephased estimated seismic data comprises generating combined seismic data that would have been acquired by a single streamer disposed at the sea surface.

9. The method of claim 8, further comprising normalizing the sum to remove residual zero phase amplitude distortion from up-going wave fields in the combined seismic data.

10. The method of claim 7, further comprising normalizing the sum.

11. The method of claim 1, wherein applying the dephase and sum algorithm comprises summing the dephased seismic data acquired by the first over/under streamer and the second over/under streamer and the dephased estimated seismic data using $$\tilde{P}'(\omega, k_x, k_y, z = 0) = \sum_{n=1,2,3} D_n(\omega, k_x, k_y, z_n),$$

where $D_n$ denotes the dephased seismic data acquired by a single streamer at the sea surface, $\omega$ denotes angular frequency and $k_x$, and $k_y$ denote spatial wavenumbers.

12. A computer-readable medium having stored thereon computer-executable instructions which, when executed by a computer, cause the computer to:
apply a shift and subtract algorithm to seismic data acquired by a first over/under streamer and a second over/under streamer to generate simulated seismic data that would have been acquired by a third over/under streamer disposed at a depth equivalent to a distance separating the first over/under streamer from the second over/under streamer, wherein the simulated seismic data comprises a ghost of up-going wave fields; and
apply a dephase and sum algorithm to the acquired seismic data and the simulated seismic data.

13. The computer-readable medium of claim 12, wherein the computer-executable instructions that cause the computer to apply the dephase and sum algorithm are configured to sum the dephased seismic data acquired by the first over/under streamer and the second over/under streamer and the dephased simulated seismic data.

14. The computer-readable medium of claim 13, further comprising computer-executable instructions which, when executed by a computer, cause the computer to normalize the sum.

15. The computer-readable medium of claim 13, wherein the computer-executable instructions that cause the computer to sum the dephased seismic data acquired by the first over/under streamer and the second over/under streamer and the dephased estimated seismic data are configured to generate combined seismic data that would have been acquired by a single streamer disposed at the sea surface.

16. The computer-readable medium of claim 15, further comprising computer-executable instructions which, when executed by a computer, cause the computer to normalize the sum to remove residual zero phase amplitude distortion from the up-going wave fields in the combined seismic data.

17. The computer-readable medium of claim 12, wherein the computer-executable instructions that cause the computer to apply the dephase and sum algorithm are configured to correlate each of the acquired seismic data and the estimated seismic data with a ghost transfer function before adding the acquired seismic data and the simulated seismic data.

18. A computer system, comprising:
a processor; and
a memory comprising program instructions executable by the processor to:
apply a shift and subtract algorithm to seismic data acquired by a first over/under streamer and a second over/under streamer to generate simulated seismic data that would have been acquired by a third over/under streamer disposed at a depth equivalent to a distance separating the first over/under streamer from the second over/under streamer, wherein the simulated seismic data comprises a ghost of up-going wave fields;
apply a dephase algorithm to the acquired seismic data and the simulated seismic data; and
sum the dephased seismic data.

19. The computer system of claim 18, wherein the program instructions executable by the processor to sum the dephased seismic data are configured to generate a combined seismic data that would have been acquired for a single streamer disposed at the sea surface.

20. The computer system of claim 18, wherein the memory further comprises program instructions executable by the processor to normalize the sum.

* * * * *